UNITED STATES PATENT OFFICE.

DOMINIC CRISPO, OF ANTWERP, BELGIUM.

PROCESS FOR THE RECOVERY OF COPPER FROM CUPROUS RESIDUES.

936,762.  Specification of Letters Patent.  Patented Oct. 12, 1909.

No Drawing.   Application filed June 29, 1909.  Serial No. 505,049.

*To all whom it may concern:*

Be it known that I, DOMINIC CRISPO, a citizen of Belgium, residing at Antwerp, in the Kingdom of Belgium, have invented new and useful Improvements in Processes for the Recovery of Copper from Cuprous Residues, of which the following is a specification.

The recovery of copper from cuprous residues that contain copper in a metallic state, is either carried out by a dry or a wet process. In the latter case dilute sulfuric acid in coöperation with oxidizing agents is allowed to act on the residues with a view to extracting the copper. Different oxidizing agents have been employed for that purpose, viz.— atmospheric oxygen or nitric acid or manganese dioxid, when the residues were rather poor in copper. Even if the treatment of the residues is performed at a raised temperature, the dissolving of the copper requires a pretty long time. I have now found, that the dissolving of the copper can be effected in a much shorter time, if an addition of iron persulfate ($Fe_2(SO_4)_3$) be made to the cuprous residues while they are being treated with dilute sulfuric acid and manganese dioxid. The iron persulfate evidently has the property of acting as a contact agent by its own presence, as it is in no way changed by the substances present. Whenever the residues containing copper in a metallic state also contain iron or iron oxid in sufficient quantities, no addition of iron persulfate is required, as, of course, the iron is oxidized and converted into persulfate by the oxidizing agents also present. The quantities of iron persulfate required depend upon the quantity of copper present in the residues and as a rule from three to four parts of persulfate should be taken for each part of copper present. As iron will frequently be present in the residues, the amount of the iron salt to be added should be determined beforehand by an analysis, so that there is sufficient iron present in the solution. The application of heat is preferable, as the solution of copper is hereby still more accelerated.

Having now particularly described my invention, what I claim, and desire to secure by Letters Patent, is:—

A process for the recovery of copper from residues containing copper in a metallic state consisting in treating those residues with dilute sulfuric acid and manganese dioxid and adding iron persulfate in sufficient quantities to act as a contact agent, whereby the dissolving of the copper present is accelerated.

In testimony whereof I have signed my name to this specification in the presence of two subscribing witnesses.

DOMINIC CRISPO.

Witnesses:
  RAOUL MOREL DE LANGEY,
  G. DE LERSY.